May 7, 1929.  J. C. HANSON ET AL  1,712,211

TRAY FOR DOUGH PROOFERS

Filed Feb. 25, 1928

INVENTORS
JAMES C. HANSON
BY GUSTAV B. EGGERT

George B. Willcox ATTORNEY

Patented May 7, 1929.

1,712,211

UNITED STATES PATENT OFFICE.

JAMES C. HANSON AND GUSTAV B. EGGERT, OF SAGINAW, MICHIGAN, ASSIGNORS TO BAKER PERKINS COMPANY, INC., OF SAGINAW, MICHIGAN, A CORPORATION OF NEW YORK.

TRAY FOR DOUGH PROOFERS.

Application filed February 25, 1928. Serial No. 257,046.

This invention relates to a novel construction for proofer trays such as are employed in dough proofers where each tray carries a number of dough pieces through the proofing chamber, being transported by a pair of parallel conveyor chains, to which the ends of the tray are secured by means of pivotally suspended hangers.

The present invention relates particularly to the construction of the tray.

The objects are to provide a multiple pocket tray made of light sheet metal, yet capable of sustaining, without deflection or distortion, the strains to which such trays are subjected in handling and in the usual operation of the proofer.

A still further object is to provide a proofer tray of such construction that it can be economically made out of sheets of thin aluminum, or other light metal, instead of requiring heavy sheets such as have heretofore been used.

The characteristic feature of the structure embodying our invention is, utilization of two members each made of thin sheet metal, one being a top plate formed with the usual dough pockets and the other a trough-like member which fits the bottoms of the pockets and is secured along its edges to the edges of the upper plate. The ends of the tubular structure thus formed are closed by end pieces of segment shape, which also may form hangers that suspend the trays from the conveyor chains by which the trays are carried through the proofing chamber.

With the foregoing and certain other objects in view, which will appear later in the specification, our invention comprises the devices described and claimed and the equivalents thereof.

In the drawings Fig. 1 is a top plan view of a proofer tray embodying our improvement.

Figure 1:
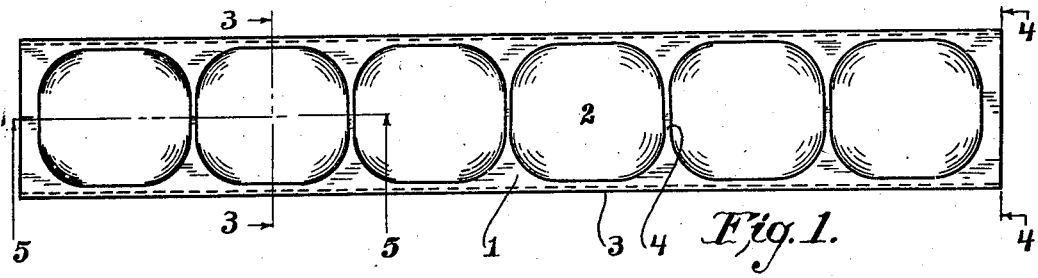
Figure 2:
Fig. 2 is a side view.
Figures 3, 4:
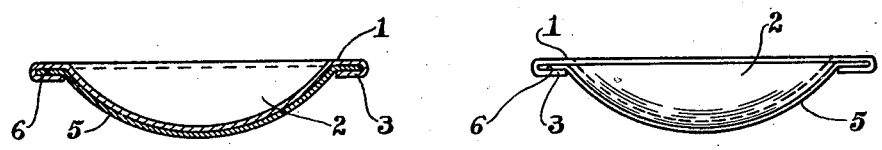
Fig. 3 is an enlarged cross section on the line 3—3 of Fig. 1.
Fig. 4 is an end view of the parts shown in Fig. 2.
Figure 5:
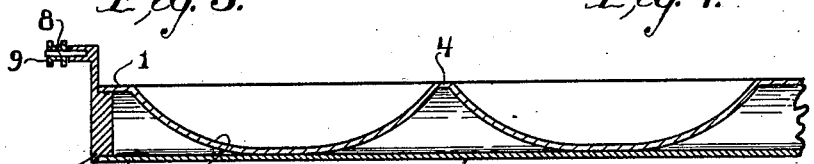
Fig. 5 is an enlarged longitudinal section on the line 5—5 of Fig. 1, showing an end piece in position.

As is clearly shown in the drawings, numeral 1 indicates the top plate made of a thin sheet of metal, such as aluminum, and formed with the usual dough pockets 2. The edges 3 of the sheet 1 are folded, as shown in Figs. 3 and 4. The lower trough-like piece 5 is also made of thin sheet metal or any other suitable material, such as fibre or composition board, and is curved to the contour of the bottom surfaces of the pockets 2, its edges formed with outwardly projecting flanges 6 received in the folded edges 3 of plate 1.

Each end of the proofer tray is preferably fitted with a closure or end piece 7 which serves the double purpose of keeping dust and dirt from the interior of the tray and providing a hanger from which the tray is suspended by means of a pivot 8 hung from a chain link 9 in the usual way.

The combination of the pocketed plate 1 and the trough-shaped plate 5 which contacts with the bottoms of the pockets, interlocked along their edges, makes a structure similar to a hollow beam which has great strength to support its uniformly distributed load and is also very strong to resist the twisting and wrenching strains to which proofer trays are sometimes subjected when the carrying chains wear or slip so that their pivot links are no longer directly opposite each other.

Furthermore, as has already been stated, the structure described enables the pocketed sheet 1 to be made of very thin light metal, which without the co-operation of the trough-like piece 5 and the interlocking of the edges of the two pieces would be unable to withstand the load.

While we have shown and described the completed tray in its preferred form as being of two separate sheets joined along their longitudinal edges, it is to be noted that various modifications in detail features may be made without departing from the invention as claimed. For example, the upper plate and the lower trough-like plate may be formed in one piece, such as a large sheet metal tube by suitably shaping it. In that case the longitudinal seams are not present.

Figure 7:
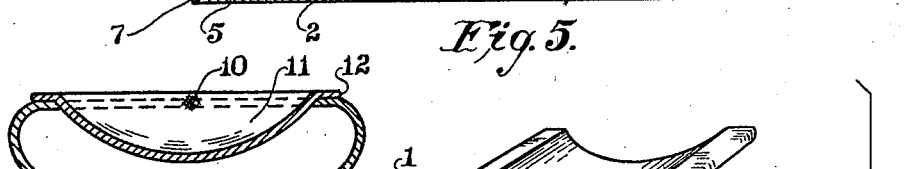
Fig. 7 is a cross sectional detail, showing a modified form of the claimed structure.
Figure 6:
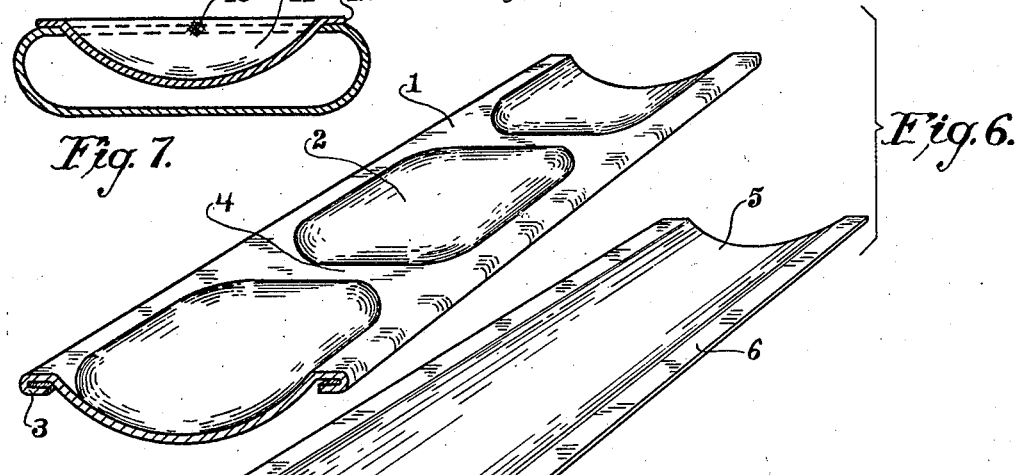
Fig. 6 is a detail showing the upper and lower plates separated.

Another modification is illustrated in Fig. 7, wherein the top plate and the trough are formed together from a single sheet, the edges of the plate being brought together into a central seam 10, welded or otherwise secured. Holes are cut in the top plate to receive the pockets 11 which are individually pressed into shape and welded to the upper plate, as at 12.

Having thus described our invention, what we claim and desire to secure by Letters Patent is:

1. A dough proofer tray comprising in combination an upper plate of sheet metal formed with pockets and having its longitudinal edges folded, a lower trough-like member of sheet material shaped to fit the bottoms of said pockets and formed with outwardly projecting flanges received in the grooves formed by the folded edges of said upper plate, and end pieces comprising closures for the ends of said trough, said end pieces provided with suspension means, for the purposes set forth.

2. A dough proofer tray comprising in combination an upper plate of sheet metal formed with pockets, a lower trough-like member of sheet material shaped to engage and provide support for the bottoms of said pockets, the longitudinal edges of said trough-like member secured to the longitudinal edges of said upper plate and closures for the ends of said trough.

3. A dough proofer tray comprising in combination an upper plate of sheet metal formed with pockets, a lower trough-like member of sheet material shaped to enclose the bottoms of said pockets, the longitudinal edges of said trough-like member secured to the longitudinal edges of said upper plate, and closures for the ends of said trough, for the purposes set forth.

4. A dough proofer tray comprising in combination an upper plate of sheet metal formed with pockets, a lower trough-like member of sheet material shaped to enclose said pockets, the longitudinal edges of said trough-like member secured to the longitudinal edges of said upper plate.

5. A dough proofer tray comprising in combination an upper member of sheet metal having pockets therein and a lower trough-like member shaped to enclose said pockets, for the purposes set forth.

In testimony whereof, we affix our signatures.

JAMES C. HANSON.
GUSTAV B. EGGERT.